United States Patent
Younis et al.

(10) Patent No.: US 11,682,135 B2
(45) Date of Patent: Jun. 20, 2023

(54) SYSTEMS AND METHODS FOR DETECTING AND CORRECTING ORIENTATION OF A MEDICAL IMAGE

(71) Applicant: GE Precision Healthcare, LLC, Milwaukee, WI (US)

(72) Inventors: Khaled Salem Younis, Parma Heights, OH (US); Katelyn Rose Nye, Waukesha, WI (US); Gireesha Chinthamani Rao, Pewaukee, WI (US); German Guillermo Vera Gonzalez, Menomonee Falls, WI (US); Gopal B. Avinash, San Ramon, CA (US); Ravi Soni, San Ramon, CA (US); Teri Lynn Fischer, Germantown, WI (US); John Michael Sabol, Sussex, WI (US)

(73) Assignee: GE PRECISION HEALTHCARE LLC, Milwaukee, WI (US)

( * ) Notice: Subject to any disclaimer, the term of this patent is extended or adjusted under 35 U.S.C. 154(b) by 180 days.

(21) Appl. No.: 16/699,368

(22) Filed: Nov. 29, 2019

(65) Prior Publication Data
US 2021/0166351 A1 Jun. 3, 2021

(51) Int. Cl.
*G06T 3/60* (2006.01)
*G06T 7/73* (2017.01)
(Continued)

(52) U.S. Cl.
CPC .............. *G06T 7/73* (2017.01); *G06F 18/214* (2023.01); *G06N 3/04* (2013.01); *G06N 3/08* (2013.01);
(Continued)

(58) Field of Classification Search
CPC ...... G06K 9/6256; G06K 9/6274; G06N 3/04; G06N 3/0454; G06N 3/08;
(Continued)

(56) References Cited

U.S. PATENT DOCUMENTS 7,519,207 B2 * 4/2009 Luo .......................... G06T 7/194
382/128
7,616,818 B2 11/2009 Dewaele
(Continued)

FOREIGN PATENT DOCUMENTS

EP 3447721 A1 2/2019
WO 2019038246 A1 2/2019

OTHER PUBLICATIONS

Joshi, Ujash et al. "Automatic Photo Orientation Detection with Convolutional Neural Networks" IEEE, 2017, 2017 14th Conference on Computer and Robot Vision, pp. 103-108.
(Continued)

*Primary Examiner* — Tsung Yin Tsai
(74) *Attorney, Agent, or Firm* — Armstrong Teasdale LLP

(57) ABSTRACT

An x-ray image orientation detection and correction system including a detection and correction computing device is provided. The processor of the computing device is programmed to execute a neural network model that is trained with training x-ray images as inputs and observed x-ray images as outputs. The observed x-ray images are the training x-ray images adjusted to have a reference orientation. The processor is further programmed to receive an unclassified x-ray image, analyze the unclassified x-ray image using the neural network model, and assign an orientation class to the unclassified x-ray image. If the assigned orientation class is not the reference orientation, the processor is programmed to adjust an orientation of the unclassified x-ray image using the neural network model, and output a corrected x-ray image. If the assigned orien-
(Continued)

tation class is the reference orientation, the processor is programmed to output the unclassified x-ray image.

18 Claims, 9 Drawing Sheets

(51) Int. Cl.
| | |
|---|---|
| *G06T 7/00* | (2017.01) |
| *G06N 3/08* | (2023.01) |
| *G06N 3/04* | (2023.01) |
| *G06F 18/214* | (2023.01) |
| *G06V 10/764* | (2022.01) |
| *G06V 10/774* | (2022.01) |
| *G06V 10/44* | (2022.01) |

(52) U.S. Cl.
CPC .............. *G06T 3/60* (2013.01); *G06T 7/0012* (2013.01); *G06V 10/454* (2022.01); *G06V 10/764* (2022.01); *G06V 10/774* (2022.01); *G06T 2207/10116* (2013.01); *G06T 2207/20081* (2013.01); *G06T 2207/20084* (2013.01)

(58) Field of Classification Search
CPC . G06T 2207/10072; G06T 2207/10116; G06T 2207/20081; G06T 2207/20084; G06T 2207/20092; G06T 2207/30004; G06T 3/60; G06T 7/0012; G06T 7/73; G06V 10/454; G06V 2201/03
See application file for complete search history.

(56) References Cited

U.S. PATENT DOCUMENTS

| | | | |
|---|---|---|---|
| 7,957,569 B2 | 6/2011 | Russak et al. | |
| 8,224,108 B2 | 7/2012 | Steinberg et al. | |
| 8,442,351 B2 | 5/2013 | Takahashi | |
| 8,737,705 B2 | 5/2014 | Pearson, Jr. et al. | |
| 9,589,374 B1 * | 3/2017 | Gao | A61B 6/5211 |
| 10,580,159 B2 * | 3/2020 | Reda | G06T 7/11 |
| 10,818,019 B2 * | 10/2020 | Piat | G06T 15/08 |
| 2007/0012881 A1 * | 1/2007 | Bartsch | A61B 6/469 |
| | | | 250/363.04 |
| 2007/0071294 A1 * | 3/2007 | Mahesh | G16H 50/20 |
| | | | 382/128 |
| 2008/0063302 A1 * | 3/2008 | Russak | G06V 10/242 |
| | | | 382/128 |
| 2011/0206275 A1 | 8/2011 | Takahaski | |
| 2012/0134468 A1 * | 5/2012 | Mabini | G16H 30/20 |
| | | | 378/62 |
| 2017/0011185 A1 * | 1/2017 | Schweizer | G16H 50/20 |
| 2018/0218516 A1 * | 8/2018 | Reda | G06T 7/11 |
| 2018/0322357 A1 | 11/2018 | Chen et al. | |
| 2019/0030371 A1 * | 1/2019 | Han | G06T 17/20 |
| 2019/0050999 A1 * | 2/2019 | Piat | G06K 9/6232 |
| 2019/0318497 A1 * | 10/2019 | Zhao | A61B 6/0407 |
| 2019/0355150 A1 * | 11/2019 | Tremblay | G06T 7/73 |
| 2020/0160527 A1 * | 5/2020 | Rapaka | G06T 7/11 |

OTHER PUBLICATIONS

Wang, Yongmei Michelle et al., "Detecting image orientation based on low-level visual content", Computer Vision and Image Understanding, 2004, vol. 93, pp. 328-346, ElsevierComputerScience. com.

Fisher, Phillip et al., "Image Orientation Estimation with Convolutional Networks", Department of Computer Science, University of Freiburg, pp. 1-11.

Baltruschat, Ivo M. et al., "Orientation Regression in Hand Radiogrphas: A Transfer Learning Approach", Institute of Medical Informatics, Universitat zu Lubeck, Lubeck Germany, Philips GmbH Innovative Technologies and Philips Medical Systems DMC GmbH, Hamburg Germany, pp. 1-8.

Boon, John M. et al., "Recognition of Chest Radiograph Orientation for Picture Archiving and Communications Systems Display Using Neural Networks," Journal of Digital Imaging, vol. 5, No. 3 Aug. 1992, pp. 190-193.

Vailaya, Aditya, et al., "Automatic Image Orientation Detection," IEEE Transactions on Image Processing, vol. 11, No. 7, Jul. 2002, pp. 746-755.

* cited by examiner

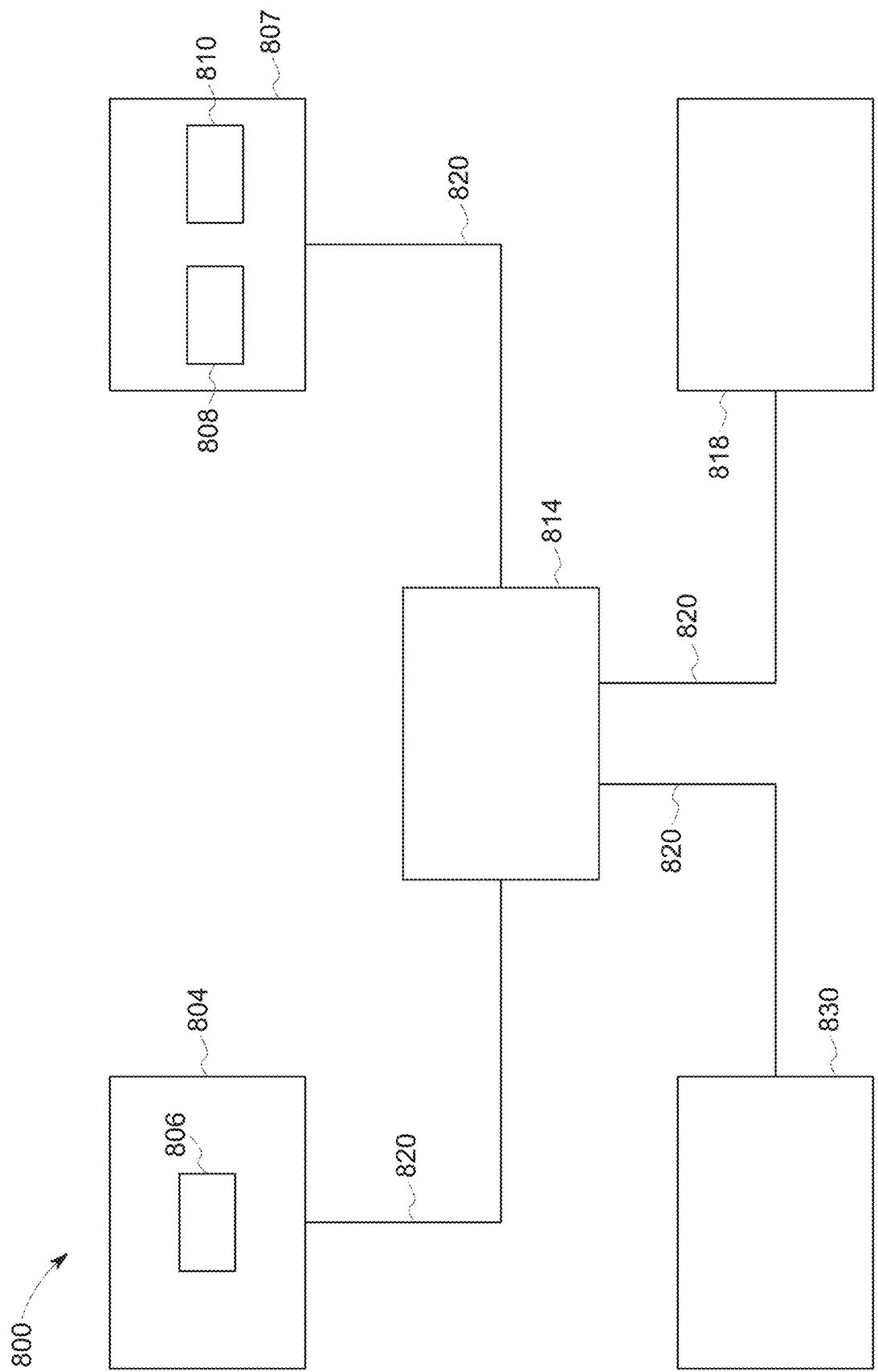

SYSTEMS AND METHODS FOR DETECTING AND CORRECTING ORIENTATION OF A MEDICAL IMAGE

BACKGROUND

The field of the disclosure relates generally to systems and methods of detecting and correcting orientation of an image, and more particularly, to systems and methods of detecting and correcting orientations of medical images using a neural network model.

Medical images are usually stored and transferred through picture archiving and communication systems (PACS) according to digital imaging and communications in medicine (DICOM) standards. Under the DICOM standards, besides image data, a medical image also includes metadata that is data related to the image such as information relating to the patient, image acquisition, and the imaging device. For example, metadata includes the orientation of the patient with respect to gravity and the gantry. DICOM standards allow communication and management of medical images and integration of medical devices such as scanners, workstations, and PACS viewers across different manufacturers.

Because of its mobility and relatively-small size, portable x-ray imaging is growing at a rate of 16.8% to become one of the most prevalent medical imaging modalities in the field of medical imaging. The orientations of images acquired by portable x-ray imaging are, however, often incorrect due to human error such as when the operator of the device mistakenly places the detector in a wrong orientation or enters a wrong orientation for the image in the user interface. While a physician has medical skills to determine that the generated image reflects an orientation different from that stored in the image metadata, an incorrect orientation may still result in the physician spending additional time to determine the correct orientation of the image before performing diagnosis. In addition, having wrong orientation information in the metadata may cause problems with hanging protocols for displaying images in a way that the user finds more useful when the images are sent to the PACS. Manually rotating the images and storing the correct orientation in the metadata before sending them to PACS takes time away from technologists. Further, images with wrong orientations may degrade the performance of a computer-aided diagnostic system or an artificial-intelligence diagnostic system if they are used as input.

BRIEF DESCRIPTION

In one aspect, an x-ray image orientation detection and correction system is provided. The system includes a detection and correction computing device. The detection and correction computing device includes at least one processor in communication with at least one memory device. The at least one processor is programmed to execute a neural network model for analyzing x-ray images, wherein the neural network model is trained with training x-ray images as inputs and observed x-ray images associated with the training x-ray images as outputs, and the observed x-ray images are the training x-ray images adjusted to have a reference orientation. The at least one processor is further programmed to receive an unclassified x-ray image, analyze the unclassified x-ray image using the trained neural network model, and assign an orientation class to the unclassified x-ray image based on the analysis. If the assigned orientation class is not the reference orientation, the at least one processor is programmed to adjust an orientation of the unclassified x-ray image using the neural network model, and output a corrected x-ray image. If the assigned orientation class is the reference orientation, the at least one processor is programmed to output the unclassified x-ray image.

In another aspect, an image orientation detection and correction system is provided. The system includes a first detection and correction computing device that includes at least one processor in communication with at least one memory device. The at least one processor is programmed to execute a neural network model for analyzing images and receive training images and observed images associated with the training images, wherein the observed images are the training images adjusted to have a reference orientation. The at least one processor is further programmed to analyze the training images, calculate predicted orientation classes for the training images using the neural network model, and correct orientations of the training images based on the predicted orientation classes using the neural network model. The at least processor is also programmed to compare orientations of the corrected images with the reference orientation, and adjust the neural network model based on the comparison.

In yet another aspect, a method of detecting and correcting orientation of an image is provided. The method includes executing a neural network model for analyzing images, wherein the neural network model is trained with training images as inputs and observed images associated with the images as outputs, and the observed images are the training images adjusted to have a reference orientation. The method also includes receiving an unclassified image, analyzing the unclassified image using the neural network model, and adjusting an orientation of the unclassified image to the reference orientation using the neural network model. The method further includes outputting an output image associated with the unclassified image and having the reference orientation.

DRAWINGS

FIG. 8 is a block diagram of an exemplary computing device.

DETAILED DESCRIPTION

The disclosure includes systems and methods for detecting and correcting orientations of images using a neural network model. X-ray images are used as exemplary images to illustrate the systems and methods as described herein. The applicability of the systems and methods, however, is not limited to X-ray images. The systems and methods are also applicable to other types of medical images, such as magnetic resonance imaging (MRI) images, computed tomography (CT) images, positron emission tomography (PET) images, and ultrasound images. The systems and methods are also applicable to images in general for detecting and correcting orientations of images.

Chest exams performed with a portable x-ray systems are one of the most frequently performed procedures. The acquired images are often in an anterior-posterior render view, where the images are taken as if a camera were aiming at the patient from the front of the patient toward the back of the patient.

Figure 1:
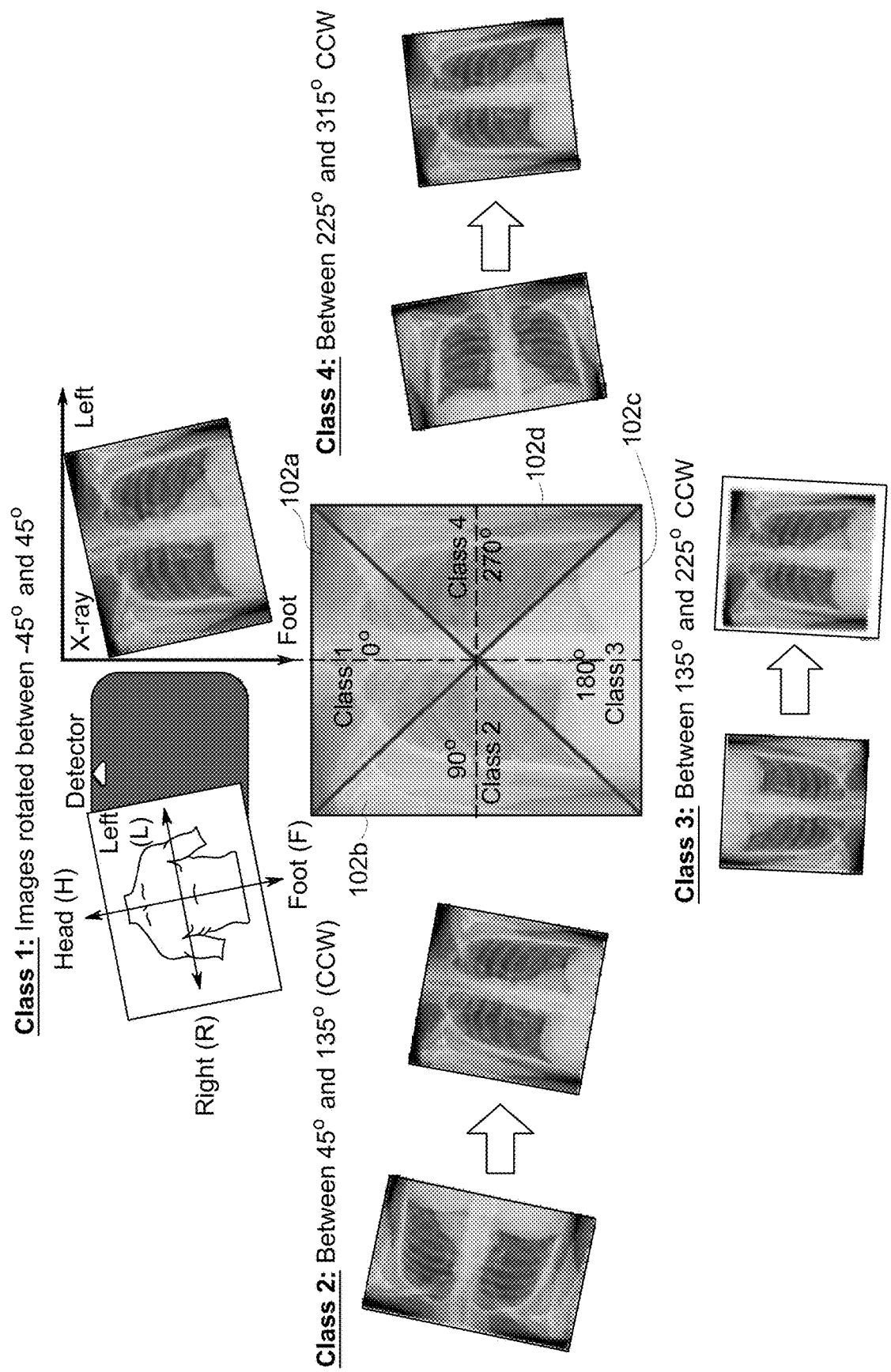
FIG. 1 is a diagram of exemplary orientation classes of chest x-ray images.

FIG. 1 is a diagram of exemplary orientation classes for chest x-ray images. An acquired x-ray image is not upright when a technologist mistakenly places the x-ray detector in an orientation other than what the technologist enters in the user interface of the system.

In the exemplary embodiment, orientation classes include contiguous circular sectors 102a, 102b, 102c, and 102d spanning 360° in a two-dimensional (2D) plane. Each of the sectors 102a, 102b, 102c, and 102d includes a central angle for the sector. For example, the orientations of x-ray images are classified into four classes, corresponding to four sectors 102a, 102b, 102c, and 102d. Central angles for sectors 102a, 102b, 102c, and 102d are 0°, 90°, 180°, and 270°, respectively. In sector 102a which is for class 1 of head-up, the image could be rotated −45° to 45° relative to the head of the patient. In sector 102b which is for class 2 of head-left, the image could be rotated between 45° and 135° counter-clockwise relative to the head. In sector 102c which is for class 3 of head-down, the x-ray detector was placed upside down and the image could be rotated between 135° and 225° counter-clockwise relative to the head. In sector 102d which is for class 4 of head-right, the image could be rotated between 225° and 315° relative to the head.

To evaluate the prevalence of rotated chest x-ray images, an analysis of 7,374 clinical images acquired by a portable x-ray device is conducted. The analysis shows only 16.8% of the images were acquired with the head in the upright position, while 43.7% of the images were rotated by 90°, 10.9% of the images were rotated by 180°, and 28.6% of the images were rotated by 270°. That is, more than 83% of the chest x-ray images were acquired with wrong orientations.

In many systems, before sending an image to a PACS, a technologist needs to manually rotate the image to an approximately upright position. Because of the wide-spread use of chest x-ray imaging, manually correcting the orientations of the x-ray images takes up a considerable amount of time from a technologist. For example, manually rotating an image at 90° or 270° may require up to three clicks in a user interface by the technologist, and rotating an image at 180° may require up to four clicks to bring the image back to the upright orientation. Based on an observation of a typical user, a workflow of manually correcting the orientation includes clicking to open a rotation pane in the user interface, clicking a button for rotating by 90°, and then closing the rotation pane. The workflow takes approximately 3 seconds. A medium- to large-sized hospital is estimated to have five portable x-ray systems on average and a portable x-ray system takes approximately 113 images on average. As a result, a technologist at a medium- to large-sized hospital spends nearly 20 hours a year conducting over 70,000 manual clicks to correct the orientations of chest x-ray images. With an artificial intelligence (AI) algorithm being 99.4% accurate, it is estimated that the 19.59 hours of manual "clicks" would be reduced to 7 minutes a year, and the 70,512 clicks to 423 clicks.

Figure 2A:
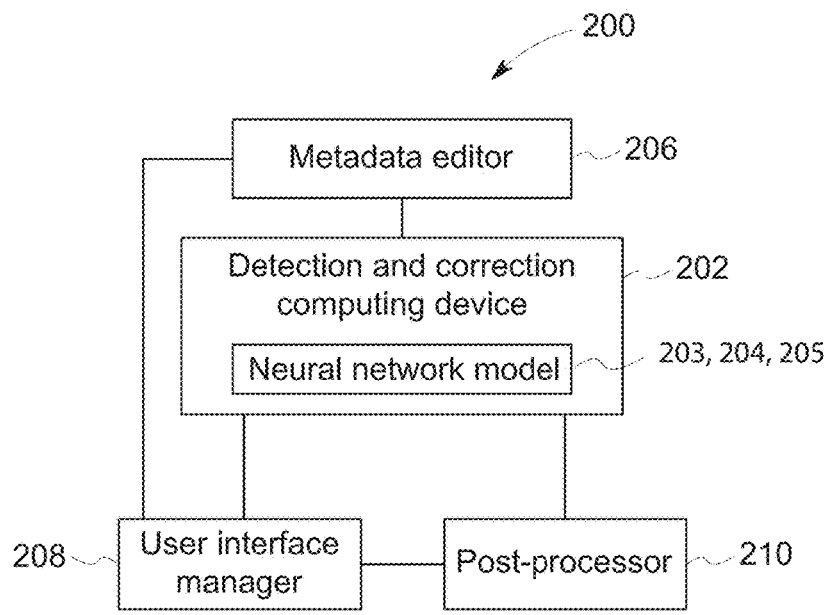
FIG. 2A is a schematic diagram of an exemplary system of detecting and correcting an orientation of an image.

FIG. 2A is a schematic diagram of an exemplary system 200 for orientation detection and correction of an image. The image may be a medical image. System 200 includes a detection and correction computing device 202 configured to detect and correct the orientation of an input image. Computing device 202 further includes a neural network model 203, 204, 205.

In the exemplary embodiment, system 200 further includes a metadata editor 206 configured to update the metadata of the image. System 200 may further include a user interface manager 208 configured to receive user inputs on choices in detecting and correcting the orientation of an input image based on these inputs. System 200 may further include a post-processor 210 for post-processing the image after an orientation of the image has been classified and/or the image has been corrected. Post-processing may include but not limited to applying mapping of intensity levels for enhancement of the image to match a preference of the radiologist.

Figure 2B:
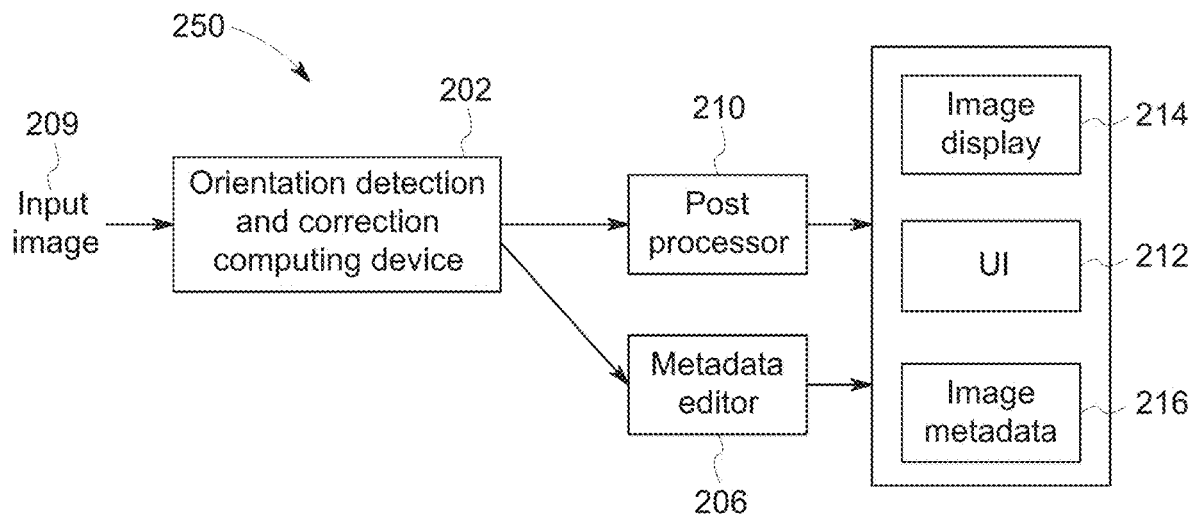
FIG. 2B is an exemplary sequence diagram of data flow in the system shown in FIG. 2A according to an aspect of the disclosure.

FIG. 2B shows an exemplary sequence diagram 250 of data flowing through system 200 without user interface manager 208 to take user inputs. In sequence 250, an input image 209 is inputted into orientation detection and correction computing device 202. Output from computing device 202 is inputted into post-processor 210 and metadata editor 206. The output from post-processor 210 and metadata editor 206 are inputted into a user interface 212 to display the corrected image in image display 214 with updated metadata 216 of the image. An alert that the orientation of the displayed image has been adjusted or corrected may be provided on image display 214 or on user interface 212. The output from post-processor 210 and metadata editor 206 may also be sent to PACS for archiving and transmitting to other systems for further processing.

Figure 2C:
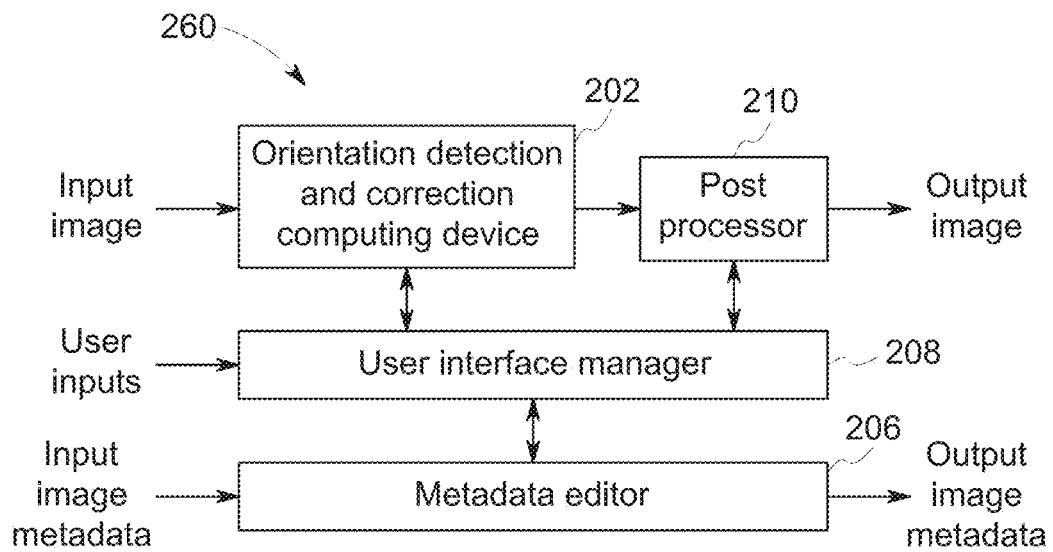
FIG. 2C is an exemplary sequence diagram of data flow in the system shown in FIG. 2A according to another aspect of the disclosure.

FIG. 2C shows another exemplary sequence diagram 260 of data flowing through system 200 with user inputs provided from user interface manager 208. User interface manager 208 receives a user policy that includes user inputs from a user. A user may choose to detect the orientation class of an input image without correcting its orientation. The user may also choose to both detect the orientation class and correct the orientation of the input image. In some embodiments, a user may choose an occasion for carrying out the function of orientation and correction computing device 202. For example, a user may choose not to correct the orientation unless the detected orientation class is a chosen orientation class such as a class 3 of head-down. In some embodiments, a user may choose the orientation classes. For example, the user may choose the location of the central angles of the sectors for the orientation classes, and may also choose the number of sectors, through user interface manager 208.

In the exemplary embodiment, user interface manager 208 communicates with computing device 202, metadata editor 206, and post-processor 210 to transmit the user inputs and update display on the user interface. In sequence 260, an input image is provided to orientation detection and correction computing device 202. The output of computing device 202 is provided to post-processor 210 and user interface manager 208. An output image is output by post-processor 210. Input image metadata is provided to metadata editor 206. Output image metadata is output from metadata editor 206. In comparison, in sequence 250, a user policy on the process of detecting and correcting orientations is predefined, instead of being provided by user interface manager 208 in sequence 260.

Figure 3A:
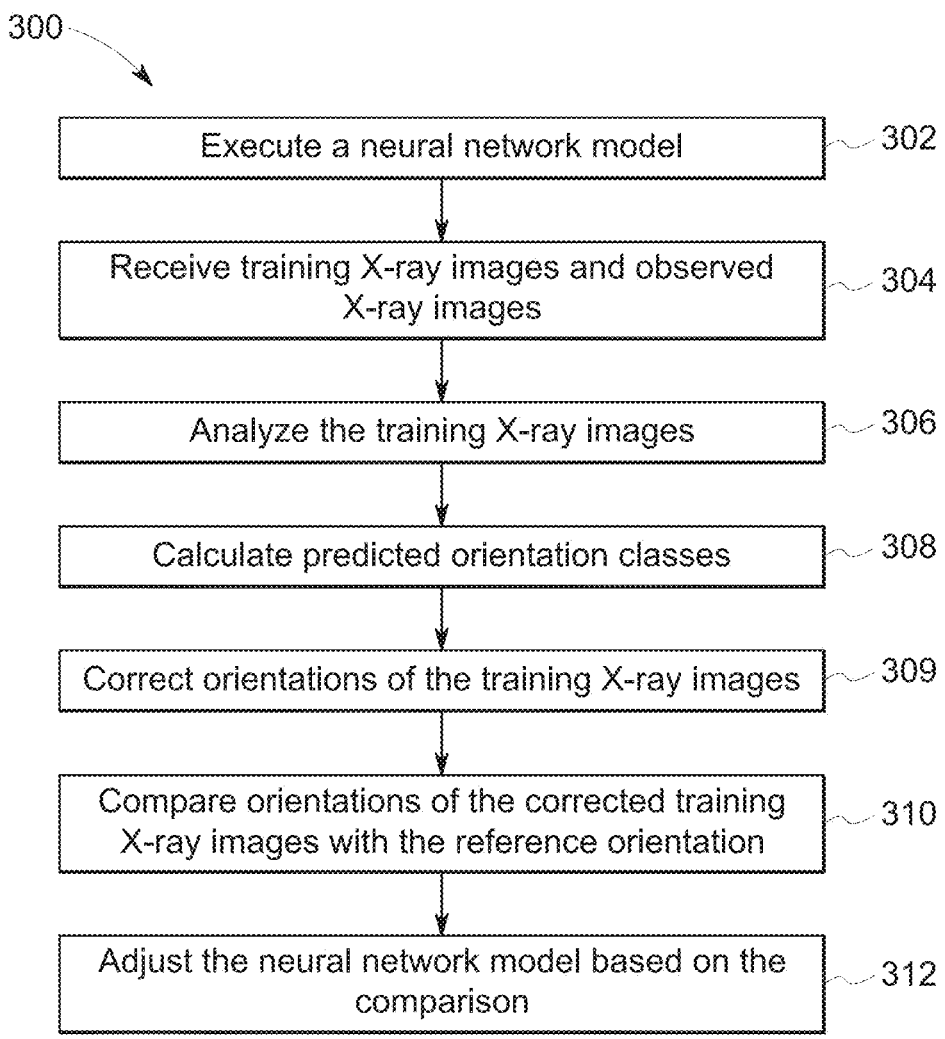
FIG. 3A is an exemplary flow chart of an exemplary method of detecting and correcting orientation of an image.

FIG. 3A illustrates an exemplary flow chart of an exemplary method 300 of detecting and correcting orientation of an x-ray image. Method 300 includes executing 302 a neural network model. Method 300 further includes receiving 304 training x-ray images and observed x-ray images associated with the training x-ray images. The observed x-ray images are the training x-ray images adjusted to have a reference orientation such as an up-right orientation. The training x-ray images and the observed x-ray images are provided to the neural network model with the training x-ray images as inputs and observed x-ray images as outputs. Method 300 also includes analyzing 306 the training x-ray images. Further, method 300 includes calculating 308 predicted orientation classes for the training x-ray images using the neural network model. Method 300 also includes correcting 309 orientations of the training x-ray images based on the predicted orientation classes using the neural network model. Moreover, method 300 includes comparing 310 the orientations of the corrected training x-ray images with the reference orientation. Method 300 also includes adjusting 312 the neural network model based on the comparison. For example, the parameters of and the number of layers and neurons of the neural network model are adjusted based on the comparison.

Figure 3B:
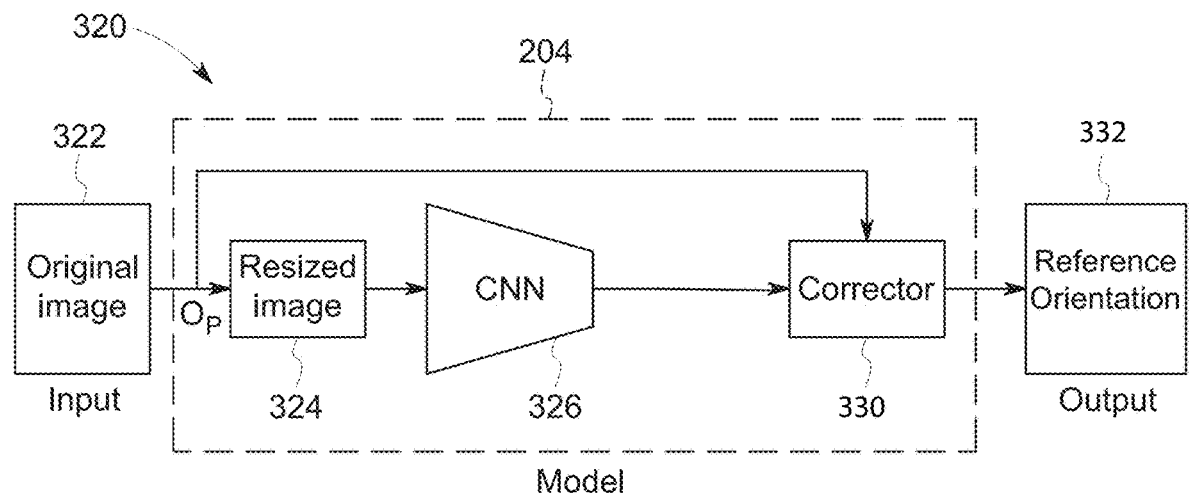
FIG. 3B is an exemplary sequence diagram of data flow in the system shown in FIG. 2A.

FIG. 3B illustrates an exemplary sequence diagram 320 of data flow in system 200 (shown in FIG. 2A). An unclassified original image 322 is inputted into neural network model 204. Original image 322 may be preprocessed such as being resized to derive a resized image 324. Neural network model 204 includes a convolutional neural network 326 configured to output orientation classes of an image inputted into convolutional neural network 326. In the exemplary embodiment, convolution neural network 326 provides one or more outputs that include the orientation class of resized image 324. In some embodiments, original image 322 may be directly input into convolutional neural network 326 without being preprocessed. Neural network model 204 also includes a corrector 330 that includes operators used to adjust orientation of an image. Based on the orientation class output by convolutional neural network 326, original image 322 is adjusted to have an orientation of a reference orientation such as up-right using corrector 330. As a result, an output image 332 having the reference orientation such as upright is output from the neural network model 204.

Figure 3C:
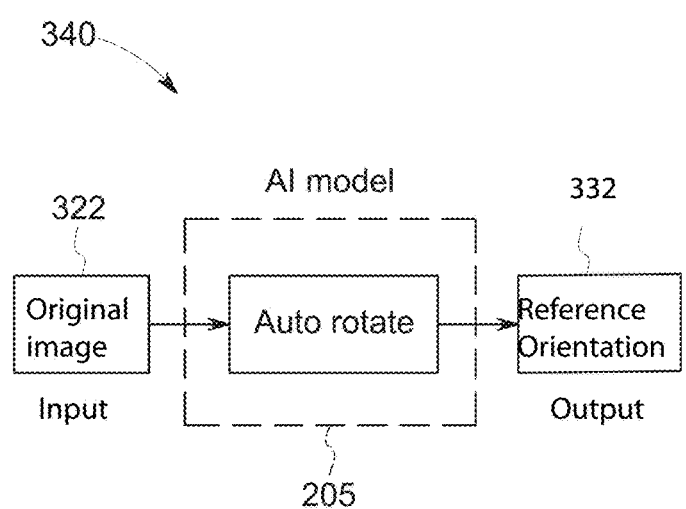
FIG. 3C is another exemplary sequence diagram of data flow in the system shown in FIG. 2A.

FIG. 3C illustrates another exemplary sequence diagram 340 of data flow in system 200. Original image 322 is input into neural network model 205. Different from neural network model 204 in FIG. 3B, neural network model 205 is configured to detect and correct orientation of an input image without corrector 330. Neural network model 205 transforms an original image 322 directly to corrected image 332 that has the reference orientation such as upright.

Figure 3D:
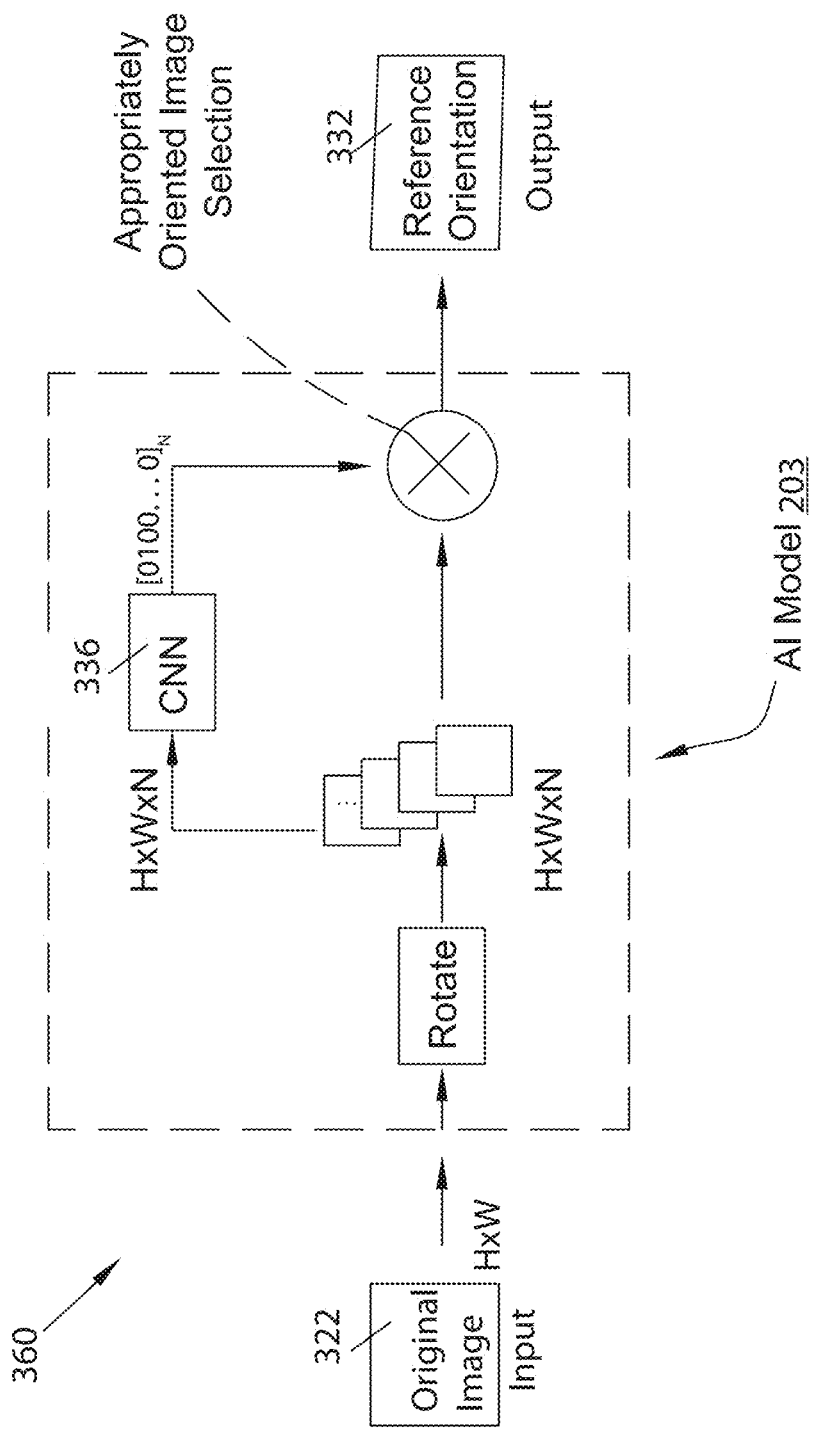
FIG. 3D is another exemplary sequence diagram of data flow in the system shown in FIG. 2A.

FIG. 3D illustrates another exemplary sequence diagram 360 of data flow in system 200. Original image 322 is input into a neural network model 203. Different from neural network model 204 in FIG. 3B and neural network model 205 in FIG. 3C, neural network model 203 is configured to transform and select the correct orientation of an input image without detector 326 and corrector 330. Neural network model 203 transforms original image 322 directly to corrected image 332 that has the reference orientation such as upright. Specifically, in neural network model 203, a plurality of rotated images are generated by rotating original image 322 by incremental angles (e.g., counter-clockwise 90°, 180°, and 270°). The rotated images and the input image are input into convolutional neural network 336 to predict which one of the images has a reference orientation, such as upright. Convolutional neural network 336 predicts the index associated with the image that has the reference orientation. A selector layer or operation in neural network model 203 selects and outputs the image associated with the predicted index.

In the exemplary embodiment, neural network model 203 is trained by inputting an image with a known (ground truth) orientation to neural network model 203. Inside neural network model 203, a plurality of rotated images of the input image are generated by rotating the input image with incremental angles (e.g., counter-clockwise 90°, 180°, and 270°). Rotation is an operation and does not have trainable parameters. A ground truth vector is generated based on the ground truth of which image among the input image and the rotated images has the reference orientation. For example, a ground truth vector of [1 0 0 0] indicates the input image has the reference orientation, a ground truth vector of [0 1 0 0] indicates the rotated image by 90° has the reference orientation, and so on. The rotated images and the input image are given to convolutional neural network 336 along with the ground truth vector to train a "selector" model, i.e., convolutional neural network 336. Convolutional neural network 336 predicts the index associated with the image having the reference orientation. Weights of convolutional neural network 336 are updated based on the predicted index in comparison with the ground truth vector. A selector layer or operation selects and outputs the image associated with the predicted index.

The training x-ray images may be preprocessed before being provided to the neural network model. Exemplary preprocessing algorithms include, but not limited to, look-up table mapping, histogram equalization, normalization, intensity transformation, gradient computation, edge detection, or a combination thereof. Training x-ray images may be downsized before being provided to the neural network model to ease the computation burden of the neural network model on a computing device. The training x-ray images may be down-sized by reducing the image resolution of the training x-ray images to generate downsized training x-ray images.

In some embodiments, the features of the training x-ray images may be extracted before being provided to the neural network model. The image features are generally derived from the distribution of intensity values of image pixels. For example, histograms of oriented gradients (HOG) features are derived by analyzing gradient orientations in localized regions of an image. The image is divided in small regions (called cells) of varying sizes. Neighboring cells may be combined in a larger region called a block. HOG features are not invariant to orientation. Features may be indicative of edges in the training x-ray images or landmarks such as certain anatomy in a patient. The extracted features from the training x-ray images are then provided to the neural network model. The features may be used in a supervised learning algorithm of the neural network model.

Figure 4:
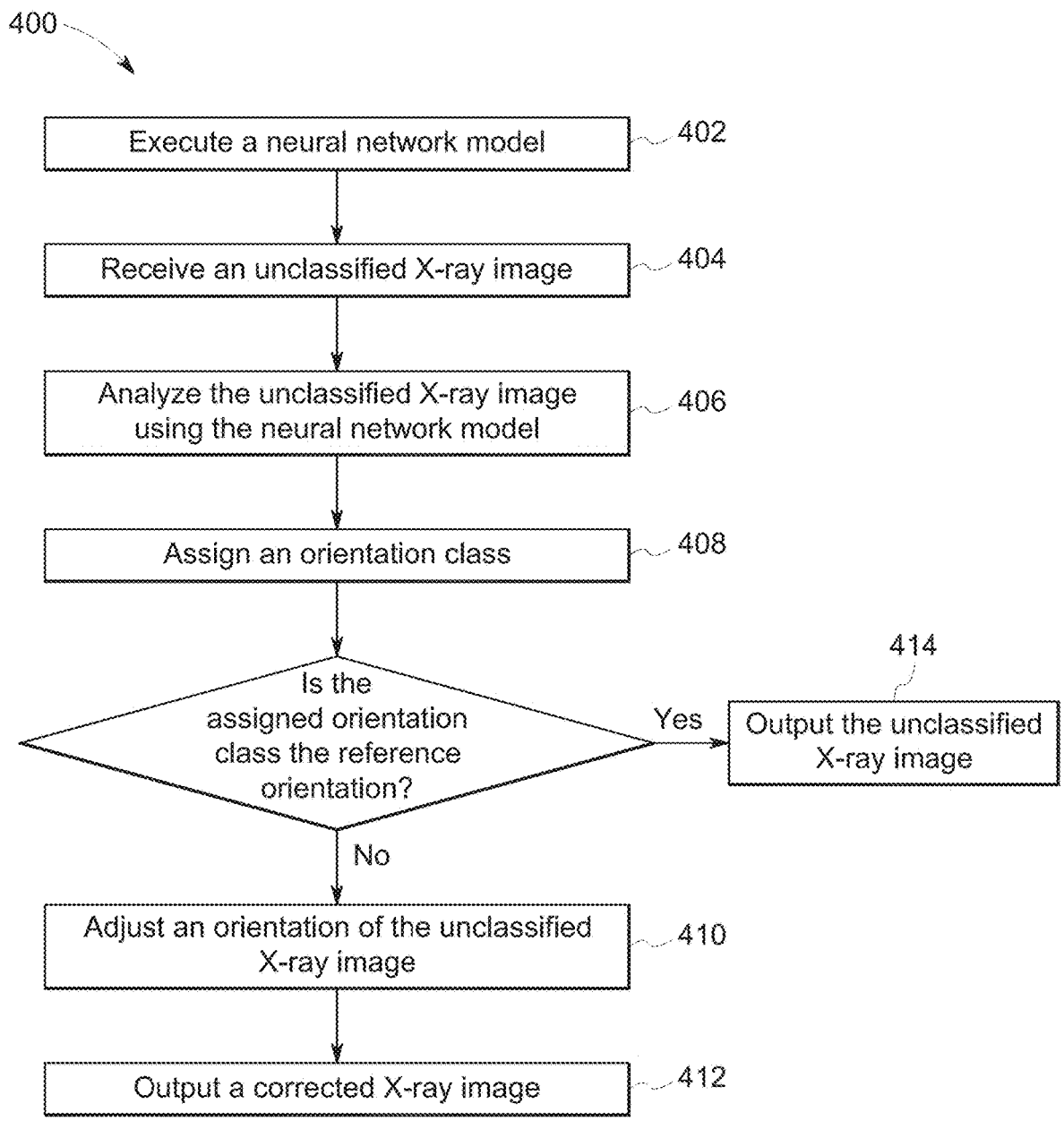
FIG. 4 is an exemplary flow chart of another exemplary method of detecting and correcting orientation of an image.

FIG. 4 illustrates an exemplary flow chart of another exemplary method 400 of detecting and correcting an input image. Method 400 includes executing 402 a neural network model. The neural network model is trained with training x-ray images as inputs and orientation classes associated with the training x-ray images as outputs. The neural network model is further trained with the training x-ray images as inputs and corrected training x-ray images associated with the x-ray images as outputs, where the corrected training x-ray images have a target orientation class.

In the exemplary embodiment, method 400 also includes receiving 404 an unclassified x-ray image, an orientation class of which has not been classified. Method 400 also includes analyzing 406 the unclassified x-ray image using the neural network model. An orientation class of the unclassified x-ray image is then assigned 408 based on the analysis. If the assigned orientation class is the target orientation class, the unclassified x-ray image has a correct orientation and is outputted 414. If the assigned orientation class is not the target orientation class, the unclassified x-ray image is adjusted 410. In some embodiments, the unclassified x-ray image is adjusted using the neural network model, where the neural network model outputs a corrected x-ray image associated with the unclassified x-ray image. In some embodiments, the unclassified x-ray image is adjusted by rotating the unclassified x-ray image to have an orientation of the target orientation. In an exemplary embodiment, the target orientation class is class 1 of head-up. If an unclassified x-ray image is assigned with a class 2 of head-left, the x-ray image is rotated clockwise 90°. For a class 3 of head-down, the x-ray image is rotated clockwise or counterclockwise 90° twice. For a class 4 of head-right, the x-ray image is rotated counterclockwise 90°. The unclassified x-ray image may be rotated by other degrees and directions as long as afterwards the x-ray image has an orientation of the target orientation class. Method 400 also includes outputting 412 the corrected x-ray image. In some embodiments, method 400 includes concurrently outputting the corrected x-ray image and the orientation class of the input image using the neural network model. That is, the neural network model outputs both the corrected x-ray image and the orientation class of the input image.

In the exemplary embodiment, the metadata associated with the unclassified x-ray image is updated based on the detected orientation class. The metadata associated with the output x-ray image is then generated to reflect the update.

Figure 5A:
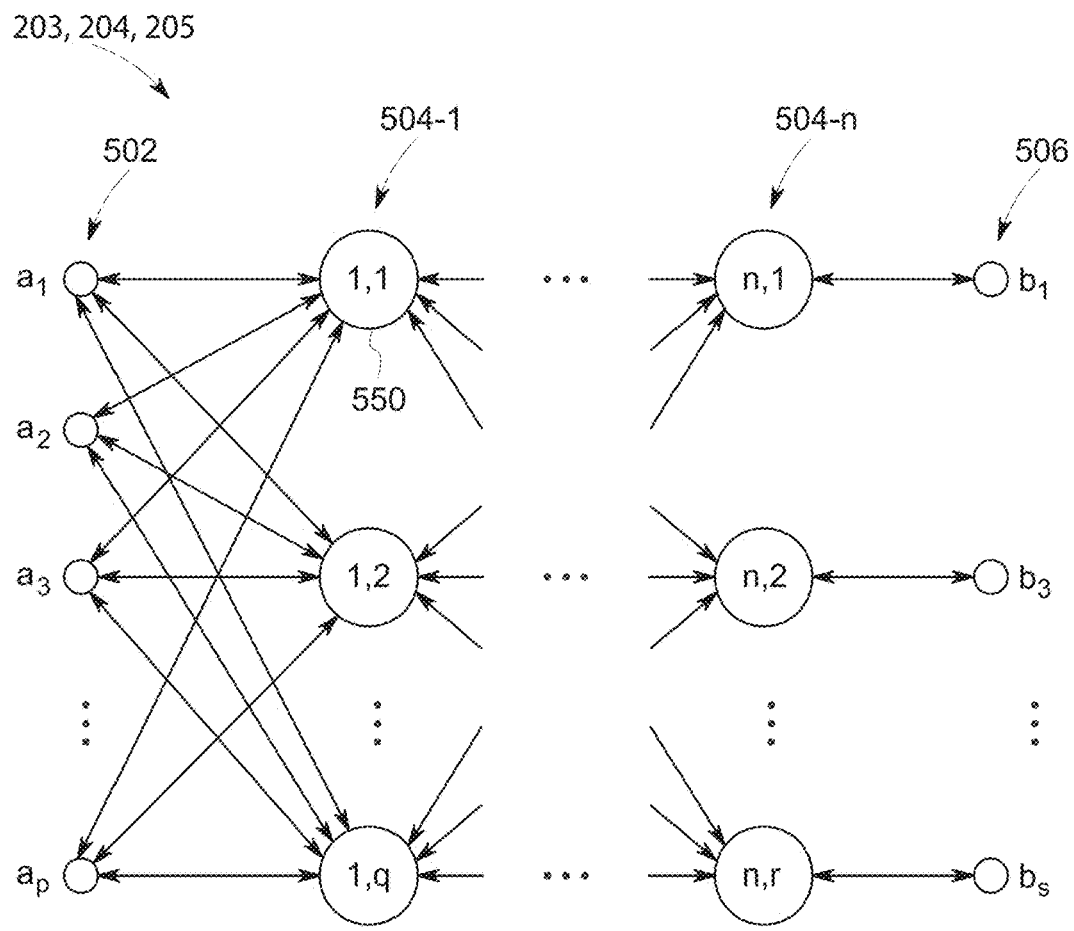
FIG. 5A is a schematic diagram of a neural network.

FIG. 5A depicts an exemplary artificial neural network model 203, 204, 205. The example neural network model 203, 204, 205 includes layers of neurons 502, 504-1 to 504-n, and 506, including input layer 502, one or more hidden layers 504-1 through 504-n, and output layer 506. Each layer may include any number of neurons, i.e., q, r, and n in FIG. 5A may be any positive integers. It should be understood that neural networks of a different structure and configuration from that depicted in FIG. 5A may be used to achieve the methods and systems described herein.

In the exemplary embodiment, input layer 502 may receive different input data. For example, input layer 502 includes a first input $a_1$ representing training x-ray images, a second input $a_2$ representing patterns identified in the training x-ray images, a third input $a_3$ representing edges of the training x-ray images, and so on. Input layer 502 may include thousands or more inputs. In some embodiments, the number of elements used by neural network model 203, 204, 205 changes during the training process, and some neurons are bypassed or ignored if, for example, during execution of the neural network, they are determined to be of less relevance.

In the example embodiment, each neuron in hidden layer(s) 504-1 through 504-n processes one or more inputs from input layer 502, and/or one or more outputs from neurons in one of the previous hidden layers, to generate a decision or output. Output layer 506 includes one or more outputs each indicating a label, confidence factor, weight describing the inputs, and/or an output image. The confidence factor and/or weight are reflective of how strongly an output orientation class indicates an orientation of an image. In some embodiments, however, outputs of neural network model 203, 204, 205 are obtained from a hidden layer 504-1 through 504-n in addition to, or in place of, output(s) from output layer(s) 506.

In some embodiments, each layer has a discrete, recognizable, function with respect to input data. For example, if n=3, a first layer analyzes the first dimension of the inputs, a second layer the second dimension, and the final layer the third dimension of the inputs. Dimensions may correspond to aspects considered strongly determinative, then those considered of intermediate importance, and finally those of less relevance.

In other embodiments, the layers are not clearly delineated in terms of the functionality they perform. For example, two or more of hidden layers 504-1 through 504-n may share decisions relating to labeling, with no single layer making an independent decision as to labeling.

Figure 5B:
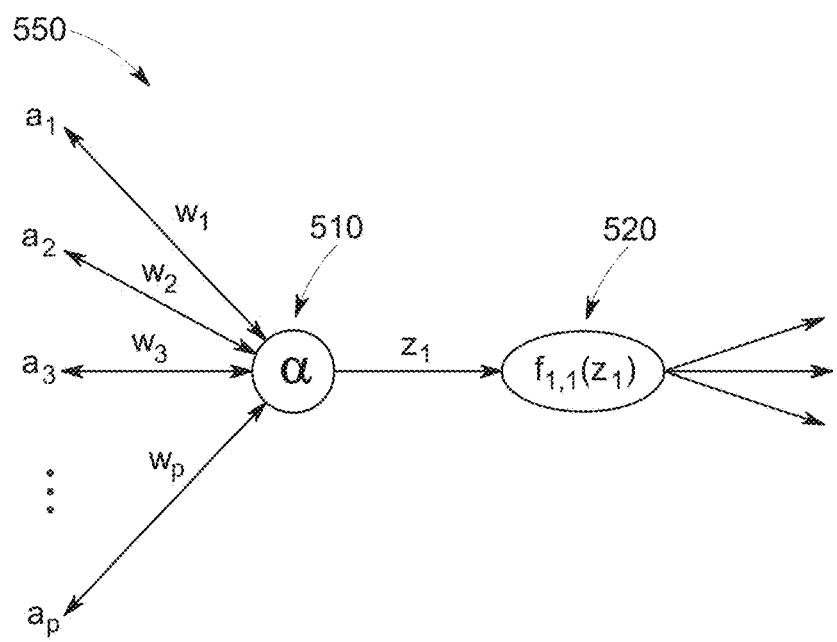
FIG. 5B is a schematic diagram of a neuron in the neural network shown in FIG. 5A.

FIG. 5B depicts an example neuron 550 that corresponds to the neuron labeled as "1,1" in hidden layer 504-1 of FIG. 5A, according to one embodiment. Each of the inputs to neuron 550 (e.g., the inputs in the input layer 502 in FIG. 5A) is weighted such that input $a_1$ through $a_p$ corresponds to weights $w_1$ through $w_p$ as determined during the training process of neural network model 203, 204, 205.

In some embodiments, some inputs lack an explicit weight, or have a weight below a threshold. The weights are applied to a function a (labeled by reference numeral 510), which may be a summation and may produce a value $z_1$ which is input to a function 520, labeled as $f_{1,1}(z_1)$. The function 520 is any suitable linear or non-linear function. As depicted in FIG. 5B, the function 520 produces multiple outputs, which may be provided to neuron(s) of a subsequent layer, or used as an output of neural network model 203, 204, 205. For example, the outputs may correspond to index values of a list of labels, or may be calculated values used as inputs to subsequent functions.

It should be appreciated that the structure and function of the neural network model 203, 204, 205 and neuron 550 depicted are for illustration purposes only, and that other suitable configurations exist. For example, the output of any given neuron may depend not only on values determined by past neurons, but also on future neurons.

Neural network model 203, 204, 205 may include a convolutional neural network, a deep learning neural network, a reinforced or reinforcement learning module or program, or a combined learning module or program that learns in two or more fields or areas of interest. Neural network model 203, 204, 205 may be trained using supervised or unsupervised machine learning programs. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, and object statistics and information. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

Based upon these analyses, the neural network model 203, 204, 205 may learn how to identify characteristics and patterns that may then be applied to analyzing image data, model data, and/or other data. For example, model 203, 204, 205 may learn to identify an orientation of an input image.

Figure 6:
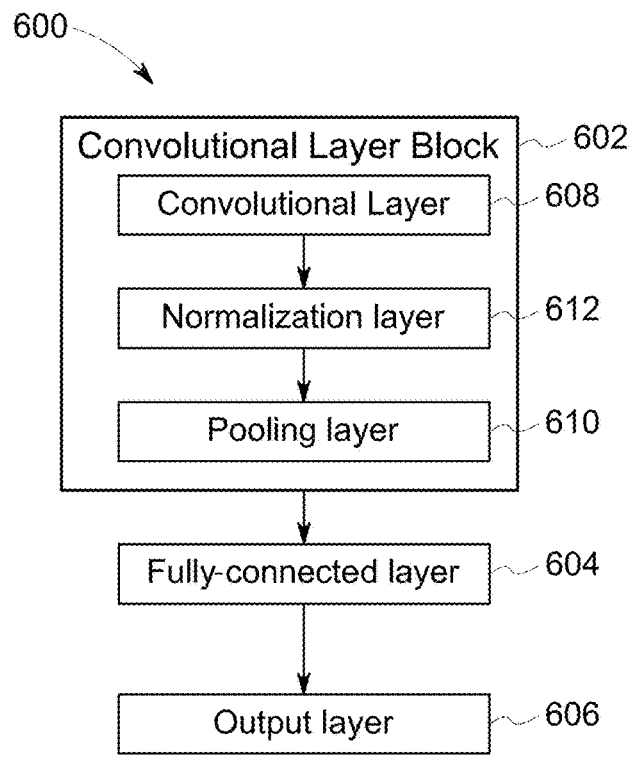
FIG. 6 is a block diagram of an exemplary neural network model.

FIG. 6 shows another exemplary neural network model 600 according to one aspect of the disclosure. Neural network model 203, 204, 205 includes neural network model 600 such as convolutional neural network 326 (shown in FIG. 3B) and convolutional neural network 336 (shown in FIG. 3D). Neural network model 600 includes a convolutional neural network that has a convolutional layer 608. In a convolutional layer 608, convolution is used in place of general matrix multiplication in a neural network model. In one example, a 1×1 convolution is used to reduce the number of channels in neural network model 600. Neural network model 600 includes one or more convolutional layer blocks 602, a fully-connected layer 604 where the neurons in this layer is connected with every neuron in the prior layer, and an output layer 606 that provides outputs.

In the exemplary embodiment, convolutional layer block 602 includes a convolutional layer 608 and a pooling layer 610. Each convolutional layer 608 is flexible in terms of its depth such as the number of convolutional filters and sizes of convolutional filters. Pooling layer 610 is used to streamline the underlying computation and reduce the dimensions of the data by combining outputs of neuron clusters at the prior layer into a single neuron in pooling layer 610. Convolutional layer block 602 may further include a normalization layer 612 between convolutional layer 608 and pooling layer 610. Normalization layer 612 is used to normalize the distribution within a batch of training images and update the weights in the layer after the normalization. The number of convolutional layer block 602 in neural network model 600 may depend on the image quality of training x-ray images, the number of orientation classes, and levels of details in extracted features. For example, the more orientation classes are used, the more convolutional layer blocks 602 are needed.

In operation, in training, training x-ray images and other data such as extracted features of the training x-ray images are inputted into one or more convolutional layer blocks 602. Observed orientation classes and/or corrected training x-ray images are provided as outputs of output layer 606. Neural network model 600 is adjusted during the training. Once neural network model 600 is trained, an input x-ray image is provided to the one or more convolutional layer blocks 602 and output layer 606 provides outputs that include orientation classes and may also include corrected x-ray image of the input x-ray image.

Figure 7:
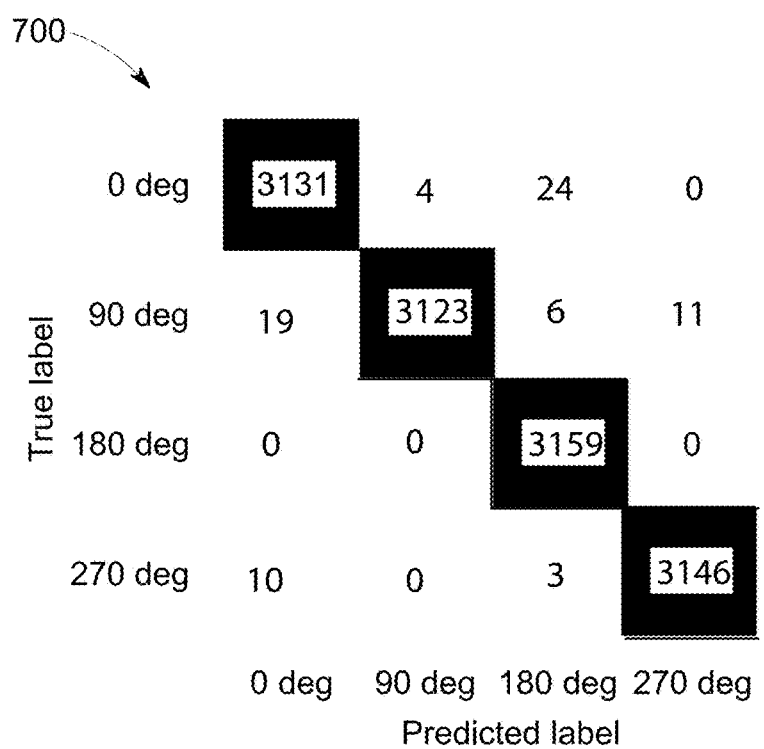
FIG. 7 is an exemplary confusion matrix illustrating the effectiveness of the methods described herein.

FIG. 7 shows an exemplary multiclass confusion matrix 700 for 12,636 test images using an exemplary system and method as described herein to predict orientation classes as illustrated in FIG. 1. A confusion matrix is used to describe the performance of an orientation detection and correction model. Matrix 700 shows the numbers of images with certain values of true labels of orientation classes and certain values of predicted labels of orientation classes by neural network model 600. The overall accuracy for identifying orientation classes with the exemplary system and method is 99.4%, with each class having accuracy greater than 98.8%.

Computing device 202, post-processor 210, user interface manager 208, metadata editor 206, and user interface 212 described herein may be implemented on any suitable computing device and software implemented therein. FIG. 8 is a block diagram of an exemplary computing device 800. In the exemplary embodiment, computing device 800 includes a user interface 804 that receives at least one input from a user. User interface 804 may include a keyboard 806 that enables the user to input pertinent information. User interface 804 may also include, for example, a pointing device, a mouse, a stylus, a touch sensitive panel (e.g., a touch pad and a touch screen), a gyroscope, an accelerometer, a position detector, and/or an audio input interface (e.g., including a microphone).

Moreover, in the exemplary embodiment, computing device 800 includes a presentation interface 807 that presents information, such as input events and/or validation results, to the user. Presentation interface 807 may also include a display adapter 808 that is coupled to at least one display device 810. More specifically, in the exemplary embodiment, display device 810 may be a visual display device, such as a cathode ray tube (CRT), a liquid crystal display (LCD), a light-emitting diode (LED) display, and/or an "electronic ink" display. Alternatively, presentation interface 807 may include an audio output device (e.g., an audio adapter and/or a speaker) and/or a printer.

Computing device 800 also includes a processor 814 and a memory device 818. Processor 814 is coupled to user interface 804, presentation interface 807, and memory device 818 via a system bus 820. In the exemplary embodiment, processor 814 communicates with the user, such as by prompting the user via presentation interface 807 and/or by receiving user inputs via user interface 804. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory device 818 includes one or more devices that enable information, such as executable instructions and/or other data, to be stored and retrieved. Moreover, memory device 818 includes one or more computer readable media, such as, without limitation, dynamic random access memory (DRAM), static random access memory (SRAM), a solid state disk, and/or a hard disk. In the exemplary embodiment, memory device 818 stores, without limitation, application source code, application object code, configuration data, additional input events, application states, assertion statements, validation results, and/or any other type of data. Computing device 800, in the exemplary embodiment, may also include a communication interface 830 that is coupled to processor 814 via system bus 820. Moreover, communication interface 830 is communicatively coupled to data acquisition devices.

In the exemplary embodiment, processor 814 may be programmed by encoding an operation using one or more executable instructions and providing the executable instructions in memory device 818. In the exemplary embodiment, processor 814 is programmed to select a plurality of measurements that are received from data acquisition devices.

In operation, a computer executes computer-executable instructions embodied in one or more computer-executable components stored on one or more computer-readable media to implement aspects of the invention described and/or illustrated herein. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

At least one technical effect of the systems and methods described herein includes (a) automatic detection of an orientation of an x-ray image; (b) automatic adjustment of an orientation of an x-ray image; and (c) increased flexibility by providing a user interface manager to receive user inputs.

Exemplary embodiments of systems and methods of detecting and correcting orientations of medical images are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An x-ray image orientation detection and correction system, comprising:
a detection and correction computing device comprising at least one processor in communication with at least one memory device, wherein said at least one processor is programmed to:
execute a neural network model for analyzing x-ray images, wherein the neural network model is trained with training x-ray images as inputs and observed x-ray images associated with the training x-ray images as outputs, and the observed x-ray images are the training x-ray images adjusted to have a reference orientation;
receive an unclassified x-ray image;
analyze the unclassified x-ray image using the neural network model;
assign an orientation class to the unclassified x-ray image based on the analysis;
if the assigned orientation class is not the reference orientation, the at least one processor is programmed to:
adjust an orientation of the unclassified x-ray image using the neural network model, wherein the neural network model is configured to generate a corrected x-ray image based on the unclassified x-ray image; and
output the corrected x-ray image generated by the neural network model; and
if the assigned orientation class is the reference orientation, the at least one processor is programmed to output the unclassified x-ray image.

2. The system of claim 1, wherein the neural network model includes a corrector, and wherein said at least one processor is further programmed to concurrently, using the neural network model, detect the orientation class of the unclassified x-ray image and generate, using the corrector of the neural network model, the corrected x-ray image based on the unclassified x-ray image.

3. The system of claim 1, wherein the neural network model is a deep learning neural network model.

4. The system of claim 1, further comprising a metadata editor configured to:
update metadata associated with the unclassified x-ray image based on the detected orientation class of the unclassified x-ray image; and
generate metadata associated with the output x-ray image.

5. The system of claim 1, further comprising a user interface manager configured to:
receive a user input; and
generate a user policy based on the user input,
wherein said at least one processor is further programmed to correct the orientation of the unclassified x-ray image based on the user policy.

6. The system of claim 1, wherein the training x-ray images are classified into a plurality of orientation classes that include contiguous circular sectors spanning 360 degrees, each of the sectors includes a central angle for the sector, and said at least one processor is further programmed to correct the orientation of the unclassified x-ray image based on a user policy that includes the central angle for the sector, wherein the user policy is predefined.

7. The system of claim 1, wherein the neural network model is trained with downsized training x-ray images as inputs.

8. The system of claim 1, wherein the neural network model is trained with preprocessed training x-ray images as inputs.

9. The system of claim 1, wherein said at least one processor is configured to alert a user that the output x-ray image is a corrected x-ray image.

10. The system of claim 1, wherein at least one of the training images input to the neural network model has a ground truth orientation of the at least one of the training images.

11. The system of claim 10, wherein the neural network model is further trained by generating a ground truth vector associated with rotated images of the at least one of the training images based on the ground truth orientation.

12. An image orientation detection and correction system, comprising:
a first detection and correction computing device comprising at least one processor in communication with at least one memory device, wherein said at least one processor is programmed to:
execute a neural network model for analyzing images;
receive training images and observed images associated with the training images, wherein the observed images are the training images adjusted to have a reference orientation;
analyze the training images;
calculate predicted orientation classes for the training images using the neural network model;
correct orientations of the training images based on the predicted orientation classes using the neural network model;
compare orientations of the corrected images with the reference orientation;
adjust the neural network model based on the comparison;
receive an unclassified image;
analyze the unclassified image using the neural network model;
assign an orientation class to the unclassified image based on the analysis; and
if the assigned orientation class is not the reference orientation, the at least one processor is further programmed to:
adjust an orientation of the unclassified image using the neural network mode, wherein the neural network model is configured to generate a corrected x-ray image based on the unclassified image; and
output the corrected image generated by the neural network model; and
if the assigned orientation class is the reference orientation, the at least one processor is further programmed to output the unclassified image.

13. The system of claim 12, wherein said at least one processor is further programmed to concurrently detect the orientation class of the unclassified image and correct the orientation of the unclassified image.

14. A method of detecting and correcting orientation of an image, said method comprising:
executing a neural network model for analyzing images, wherein the neural network model is trained with training images as inputs and observed images associated with the images as outputs, and the observed images are the training images adjusted to have a reference orientation;
receiving an unclassified image;
analyzing the unclassified image using the neural network model;
adjusting an orientation of the unclassified image to the reference orientation using the neural network model; and
outputting an output image associated with the unclassified image and having the reference orientation;
assigning an orientation class to the unclassified image based on the analysis;
if the assigned orientation class is not the reference orientation, said method further comprising:
adjusting the orientation of the unclassified image using the neural network model, wherein the neural network model is configured to generate a corrected x-ray image based on the unclassified image; and
outputting the corrected x-ray image generated by the neural network model; and
if the assigned orientation class is the reference orientation, said method further comprising outputting the unclassified image.

15. The method of claim 13, further comprising:
updating, using a metadata editor, metadata associated with the unclassified image based on the detected orientation class of the unclassified image; and
generating, using the metadata editor, metadata associated with the output image.

16. The method of claim 14, further comprising:
rotating the unclassified image in a plurality of angles to derive a plurality of rotated images;
predicting an index associated with an image having the reference orientation among the unclassified image and the plurality of rotated images using the neural network model; and
outputting the output image using the predicted index.

17. The method of claim 14, further comprising:
receiving, using a user interface manager, a user input;
generating, using the user interface manager, a user policy based on the user input; and
correcting the orientation of the unclassified image based on the user policy.

18. The method of claim 14, wherein the neural network model is a deep learning neural network model.

* * * * *